US011001201B2

(12) United States Patent
Weston et al.

(10) Patent No.: US 11,001,201 B2
(45) Date of Patent: May 11, 2021

(54) HAPTIC FEEDBACK FOR TRANSMISSION SHIFTER

(71) Applicant: Ford Global Technologies, LLC, Dearborn, MI (US)

(72) Inventors: Keith Weston, Canton, MI (US); Ryan Orourke, Dearborn, MI (US); Enzo Campagnolo, Commerce Township, MI (US); Edwin Ho, Royal Oak, MI (US); Trystan Magnuson, Dearborn, MI (US); Nikhil Subramaniam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/447,527

(22) Filed: Jun. 20, 2019

(65) Prior Publication Data

US 2020/0398748 A1 Dec. 24, 2020

(51) Int. Cl.
*G08B 21/24* (2006.01)
*B60Q 9/00* (2006.01)
(Continued)

(52) U.S. Cl.
CPC .............. *B60Q 9/00* (2013.01); *B60K 20/04* (2013.01); *B60K 20/06* (2013.01)

(58) Field of Classification Search
CPC .. B60W 2540/16; B60W 10/06; B60W 10/11; B60W 2710/1005; B60W 2520/10; B60W 2540/10; B60W 2554/00; B60W 2554/80; B60W 2555/60; B60W 2050/143; B60W 2510/0208; B60W 2510/1015; B60W 2710/0644; B60W 30/19; B60W 2050/0066; B60W 2050/0085; B60W 20/13; B60W 30/146; B60W 30/18063; B60W 40/06; B60W 50/00; B60W 2540/12; B60W 2710/0605; B60W 2710/0633; B60W 2710/065; B60W 2710/0666; B60W 30/188; B60W 50/0098; B60W 50/14;
(Continued)

(56) References Cited

U.S. PATENT DOCUMENTS 8,996,261 B2 3/2015 Sata
9,163,718 B2 10/2015 Nelson et al.
(Continued)

FOREIGN PATENT DOCUMENTS

WO 2018097829 A1 5/2018

OTHER PUBLICATIONS

Garcia-Canseco et al., "A Haptic Gearshift Interface for Cars", Conference Paper, Jul. 2010, https://www.researchgate.net/publication/221012561_A_Haptic_Gearshift_Interface_for_Cars?enrichId=rgreq-626eb15635de706485b6556a476d5518-XXX&enrichSource=Y292ZXJQYWdlOzlyMTAxMjU2MTtBUzoxMDQ3Mjk0MDk0OTA5NDIAMTQwMTk4MDg0NTI1MQ%3D%3D&el=1_x_2&_esc=publicationCoverPdf.

(Continued)

*Primary Examiner* — Daniel Previl
(74) *Attorney, Agent, or Firm* — Frank Lollo; Bejin Bieneman PLC

(57) ABSTRACT

A system includes a vehicle transmission shifter input device; and a computer. The computer includes a processor and a memory, the memory including instructions such that the processor is programmed to detect, via the shifter input device, a user input to shift the vehicle transmission; and generate, a haptic feedback via the shifter input device.

17 Claims, 6 Drawing Sheets

(51) Int. Cl.
*B60K 20/04* (2006.01)
*B60K 20/06* (2006.01)

(58) Field of Classification Search
CPC ...... B60W 10/08; B60W 10/18; B60W 20/16;
B60W 2510/06; B60W 2710/083; B60W
2720/10; B60W 50/06; B60W 10/10;
B60W 10/115; B60W 2050/0041; B60W
20/10; B60W 2510/0241; B60W
2510/0275; B60W 2510/0283; B60W
2510/0666; B60W 2510/085; B60W
2510/1005; B60W 2510/104; B60W
2510/1045; B60W 2510/106; B60W
2510/107; B60W 2510/1075; B60W
2510/108; B60W 2510/1085; B60W
2510/1095; B60W 2510/244; B60W
2510/305; B60W 2540/215; B60W
2710/0677; B60W 2710/086; B60W
2710/1061; B60W 50/082; B60W
2050/0096; B60W 2710/10; B60W
30/1882; B60W 2520/04; B60W 2540/21;
B60W 30/18018; B60W 30/00; B60W
2040/0872; B60W 2420/42; B60W
2540/22; B60W 2540/223; B60W
2540/225; B60W 2540/229; B60W
2556/05; B60W 30/095; B60W 40/08;
B60W 2050/146; B60W 20/00; B60W
2540/14; B60W 50/08; B60W 50/10;
B60W 50/16; B60W 20/12; B60W 20/15;
B60W 2510/0619; B60W 2556/50; B60W
30/182; B60W 20/30; F16H 2059/0247;
F16H 59/02; F16H 59/44; F16H 59/60;
F16H 61/0204; F16H 63/40; F16H
2061/168; F16H 59/044; F16H 61/16;
F16H 59/54; F16H 2059/0221; F16H
2059/0239; F16H 2059/366; F16H
59/0204; F16H 59/36; F16H 61/0213;
F16H 2057/02013; F16H 2057/02043;
F16H 2057/02052; F16H 2057/0206;
F16H 2057/02091; F16H 2057/0235;
F16H 57/037; F16H 2059/026; F16H
2059/081; F16H 2059/082; F16H
59/0217; F16H 59/0278; F16H 59/12;
F02D 11/105; F02D 2200/606; F02D
2200/701; F02D 41/0002; F02D 41/021;
F02D 2041/026; F02D 2220/0625; F02D
29/02; F02D 41/025; F02D 41/027; F02D
41/1461; F02D 41/2438; F02D 41/3005;
G06Q 10/00; G06Q 10/06; G06Q 10/20;
G07C 5/08; G07C 5/0825; G07C 5/0866;
Y02T 10/42; Y02T 10/62; Y02T 10/40;
Y02T 10/72; Y02T 90/16; Y02T 10/70;
Y02T 10/7072; Y02T 10/12; Y02T 10/64;
Y02T 10/84; Y02T 90/12; B60K 20/06;
B60K 6/22; B60K 2006/4825; B60K
6/48; B60K 17/04; B60K 13/662; B60K
13/686; B60K 17/02; B60K 17/221;
B60K 2220/04; B60K 8/17; B60K 8/172;
B60K 8/32; B60K 8/3255; B60L
15/2063; B60L 2240/12; B60L 2240/421;
B60L 15/2009; B60L 2240/423; B60L
2250/26; B60L 15/2045; B60L 2240/622;
B60L 3/00; B60L 3/12; B60L 50/15;
B60L 50/16; B60L 50/50; B60L 50/66;
B60L 53/32; B60L 58/12; B60L 58/13;
B60L 58/16; B60T 8/32; B60T 8/3255;
B60T 13/662; B60T 13/686; B60T 17/02;
B60T 17/18; B60T 17/221; B60T
2220/04; B60T 8/17; B60T 8/172; B60T
7/122; B60Y 2200/91; B60Y 2200/92;
B60Y 2300/188; B60Y 2304/076; B60Y
2400/432; F01N 3/035; F01N 3/2013;
F01N 3/2066; F01N 11/00; F01N
2260/00; F01N 2560/00; F01N 2590/11;
F01N 2610/02; F01N 2900/10; F01N
3/10; F01N 9/00; F02N 11/0829; F02N
11/0803; F02N 11/0818; G01M 3/002;
G01M 3/26; G08B 6/00; G10K 15/02;
H04R 2499/13; H04R 5/04; B62D 15/00;
B62D 6/007; B62D 63/08; Y10T
74/20146; Y10T 74/19242; Y10T
74/20159; B60C 23/16; B60C 9/00; Y10S
903/93; H04N 5/2254; H04N 5/2258;
H04N 7/181; H04N 7/183; H04N 5/247;
B60Q 5/005; B60Q 9/008; B60Q 9/00;
B60S 9/04; B60S 9/08; B60S 9/12;
H02M 1/4208; H02M 2001/0012; H02M
2001/008; H02M 5/4505; H02M 5/4585;
H02M 7/493; Y02B 70/10; Y02B 70/126;
G06K 9/0085; G06K 9/00845; G06K
9/6257; G06K 9/6267; G06K 9/6289;
G06K 9/6293; G08G 1/166; G08G 1/165;
G08G 1/167; G08G 1/0112; G08G
1/0129; G08G 1/0145; G08G 1/04; B29C
45/0017; B29C 45/14639; B29C
45/14754; B29C 45/1671; B29L
2011/0058; B29L 2031/30; B60R 11/04;
B60R 1/00; B60R 1/04; B60R 1/06;
B60R 1/12; B60R 2001/1215; B60R
2001/1223; B60R 2001/1253; B60R
2001/1269; B60R 2011/0033; B60R
2300/105; B60R 2300/308; B60R
2300/8026; B60R 2300/8066; B60R
2300/808; B60R 2300/8093; G09G
2300/023; G09G 2300/0456; G09G
2340/12; G09G 2380/10; G09G 3/001;
G09G 3/346; G09G 5/026; G05D 1/021;
G05D 1/0214; G05D 1/0221; G05D
1/0251; G05D 2201/0213; G06N 20/00;
G06N 3/04; G06N 3/084; F16D 48/06;
Y02A 50/20; G06T 7/70; G06T
2207/10016; G06T 2207/30232; G06T
2207/30261; G06T 7/13; G06T
2207/20076; G06T 7/50
USPC ..... 340/457, 453, 456, 457.3, 566, 683, 7.6,
340/309.16, 407.1
See application file for complete search history.

(56) References Cited

U.S. PATENT DOCUMENTS

| | | | |
|---|---|---|---|
| 10,086,840 B2* | 10/2018 | Cunningham | ......... B60W 10/11 |
| 2009/0218160 A1* | 9/2009 | Baluch | ............... B60K 20/06 |
| | | | 180/336 |
| 2012/0095656 A1* | 4/2012 | Pudvay | ............. F16H 59/044 |
| | | | 701/51 |
| 2014/0116179 A1* | 5/2014 | Sata | .................. B60K 20/06 |
| | | | 74/473.31 |
| 2014/0121913 A1* | 5/2014 | Sata | .................. B60K 20/06 |
| | | | 701/52 |

(56) References Cited

U.S. PATENT DOCUMENTS

| | | | | |
|---|---|---|---|---|
| 2014/0318293 | A1* | 10/2014 | Nelson | B60W 50/16 |
| | | | | 74/473.3 |
| 2015/0198235 | A1* | 7/2015 | Baumgartner | B60W 50/082 |
| | | | | 701/52 |
| 2015/0199955 | A1 | 7/2015 | Draganic | |
| 2016/0101768 | A1* | 4/2016 | Mori | B60W 10/11 |
| | | | | 701/54 |
| 2016/0363213 | A1* | 12/2016 | Adames | F16H 61/0213 |
| 2017/0089274 | A1* | 3/2017 | Kolhouse | F02D 41/0002 |
| 2018/0029598 | A1* | 2/2018 | Cunningham | B60W 30/188 |
| 2019/0120370 | A1* | 4/2019 | Dimig | F16H 59/0278 |
| 2019/0217851 | A1* | 7/2019 | Light-Holets | B60W 20/16 |
| 2019/0299974 | A1* | 10/2019 | Rauch | F02D 29/02 |

OTHER PUBLICATIONS

"Ford's Vibrating Shifter Teaches Simpletons How to Drive a Manual", https://www.wired.com/2013/07/ford-shifter/.

Gaffary et al., "The Use of Haptic and Tactile Information in the Car to Improve Driving Safety: A Review of Current Technologies", Frontiers in ICT | www.frontiersin.org, Mar. 2018, vol. 5, Article 5.

* cited by examiner

HAPTIC FEEDBACK FOR TRANSMISSION SHIFTER

BACKGROUND

Vehicle transmissions can change a gear ratio between a propulsion component (engine and/or motor) and vehicle wheels based on input from a user. A shifter input device such as a paddle shifter or console shifter receives an input from the user and provides user input data to a computer such as a transmission control module or the like. In response to the user input data, the computer provides an input to the vehicle transmission.

DETAILED DESCRIPTION

Introduction

Figure 1:
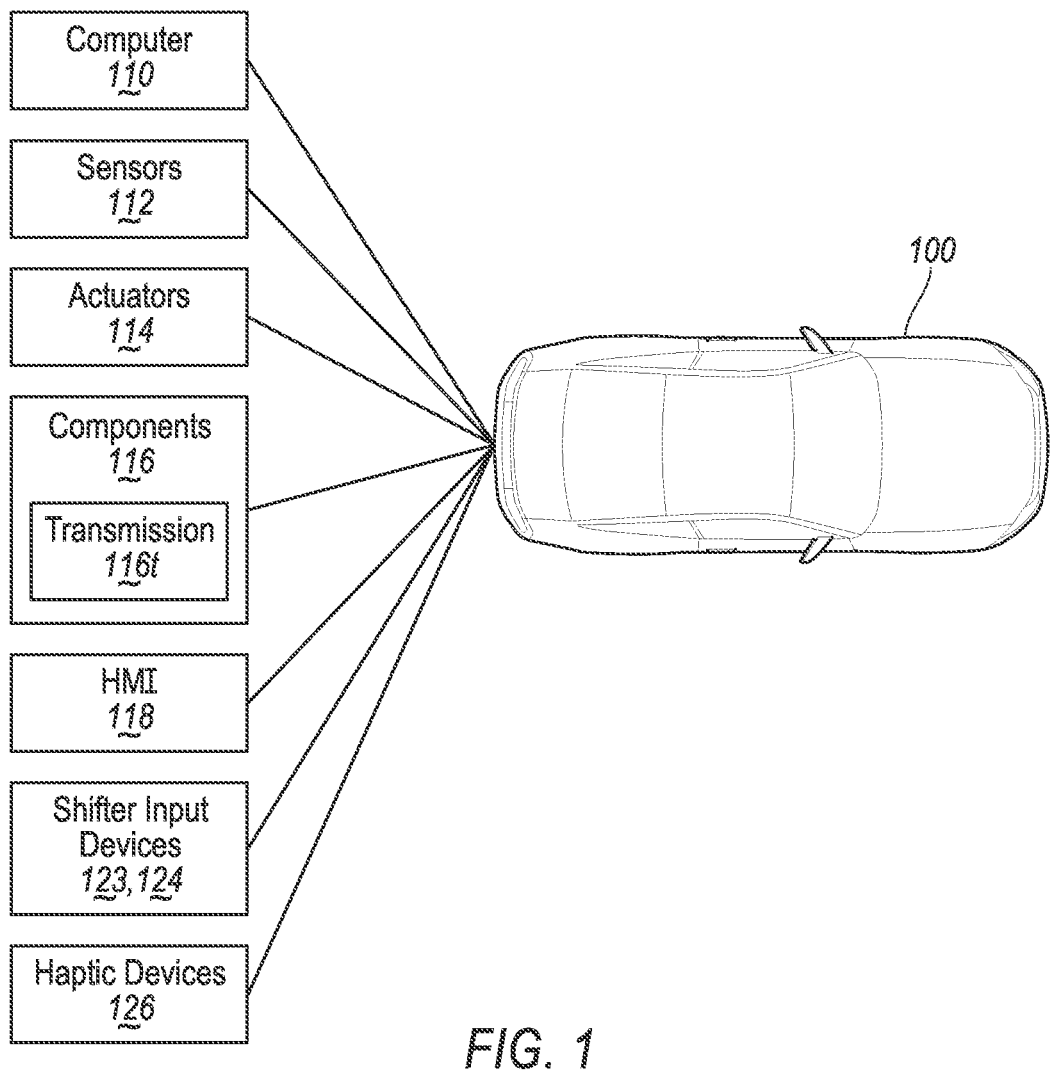
FIG. 1 is a diagram illustrating an example system for providing haptic feedback to a user in response to user input on a shifter input device.

Disclosed is a system comprising a vehicle transmission shifter input device; and a computer. The compute comprises a processor and a memory, the memory including instructions such that the processor is programmed to detect, via the shifter input device, a user input to shift the vehicle transmission; and generate, via the shifter input device, a haptic feedback.

In the system, the haptic feedback can be vibratory.

In the system, the shifter input device can include a paddle shifter.

In the system, the paddle shifter can be displaceable and detecting the user input can include detecting a displacement of the paddle shifter greater than a predetermined displacement.

In the system, detecting the user input further can include detecting the displacement of the paddle shifter for an amount of time greater than a predetermined amount of time.

In the system, the paddle shifter can be stationary and detecting the user input can include detecting a force applied to the paddle shifter greater than a predetermined force. Detecting the user input can further include detecting the force applied to the paddle shifter for an amount of time greater than a predetermined amount of time.

In the system, the haptic feedback can be generated by a linear resonant actuator. The linear resonant actuator can be embedded in the paddle shifter.

In the system, the shifter input device can include a console shifter. The console shifter can be displaceable and detecting the user input can include detecting a displacement of the console shifter greater than a predetermined displacement. Detecting the user input can further include detecting the displacement for an amount of time greater than a predetermined amount of time.

In the system, the console shifter can be stationary, and detecting the user input can include detecting a force applied to the console shifter greater than a predetermined force. Detecting the user input can further include detecting the force for an amount of time greater than a predetermined amount of time.

In the system, the haptic feedback can be generated by an eccentric rotating motor. The eccentric rotating motor can be embedded in the console shifter.

Further disclosed is a method comprising detecting, via the shifter input device on a vehicle, a user input to shift a vehicle transmission; and generating, via the shifter input device, a haptic feedback.

In the method, the shifter input device can be one selected from a group of a moving paddle shifter and a moving console shifter. Detecting the user input to shift the vehicle transmission can detecting that a displacement of the shifter input device is greater than a predetermined displacement for an amount of time greater than a predetermined amount of time.

In the method, the shifter input device can one selected from a group of a stationary paddle shifter and a stationary console shifter. Detecting the user input to shift the vehicle transmission can include detecting that a force applied to the shifter input device is greater than a predetermined force for an amount of time greater than a predetermined amount of time.

In the method, the haptic feedback can be generated by a haptic feedback device attached to or embedded in the shifter input device.

Further disclosed herein is a computing device programmed to execute any of the above method steps.

Yet further disclosed herein is a computer program product, including a computer readable medium storing instructions executable by a computer processor, to execute an of the above method steps.

Exemplary System Elements

A transmission in a vehicle may be programmed to operate in a semi-automatic mode. In the semi-automatic mode, a vehicle computer receives user input data from a shifter input device and sends commands to change a gear ratio of the vehicle transmission in response to the user input data. The gear ratio is a ratio between a rotational speed of wheels on the vehicle and a rotational speed of a propulsion component (engine or motor). A shifter input device is a device that receives user input to change the gear ratio of the transmission. The user input may be a displacement of the shifter input device, or a specified force (for example a touch in a specified direction) applied to the shifter input device.

In addition to sending commands to the transmission in response to the user input data, the vehicle computer may be programmed to provide haptic feedback to the user via a haptic device. A haptic device herein means a device that generates physical movement in response to control inputs that may include digital commands and/or electrical signals. Haptic feedback is physical movement of a haptic device that can be sensed by the user. Typically, the physical movement is a vibration, i.e., an oscillating, reciprocating and/or periodic motion.

In an example, the haptic device is attached to or included in the shifter input device. Upon recognizing a valid input from a user to change a gear ratio, the computer commands the haptic device to generate the haptic feedback, which can be sensed by the user via the shifter input device.

A vehicle 100 includes an example system for providing haptic feedback for operation of a vehicle transmission in a semi-automatic mode. The vehicle 100 is a land vehicle such as a car, truck, motorcycle, etc. The vehicle 100 includes a vehicle computer 110, sensors 112, actuators 114, vehicle components 116, a human-machine interface (HMI) 118, a transmission 116t, shifter input devices 123, 124 and haptic devices 126.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 100 propulsion, braking, and steering.

The vehicle computer 110 may include programming to operate one or more of vehicle 100 brakes, propulsion (e.g., control of acceleration in the vehicle by controlling one or more of an internal combustion engine, electric motor, hybrid engine, etc.), transmission 116t, steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations. In a semi-autonomous or manual mode, the vehicle computer 110 may be programmed to operate the transmission 116t in the semi-automatic mode.

The vehicle computer 110 may include or be communicatively coupled to, e.g., via a vehicle communications network, more than one processor, e.g., included in electronic control units (ECUs) or the like included in a vehicle 100 for monitoring and/or controlling various vehicle components 116, e.g., a powertrain controller, a brake controller, a steering controller, a transmission controller, etc. As used herein, the vehicle communications network is defined as one or more mechanisms for wired or wireless communications between systems and sub-systems of the vehicle 100. The vehicle communications network can include, for example, one or more vehicle communications busses and one or more wireless communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), and Wi-Fi Direct.

Via the vehicle communications network, the vehicle computer 110 may transmit messages to various systems and subsystems in the vehicle 100 and/or receive messages from the various devices, e.g., sensors 112; actuators 114; vehicle components 116; a human-machine interface (HMI) 118; the transmission 116t; a shifter input device 123, 124; a haptic device 126; etc. Additionally, in cases where the vehicle computer 110 actually comprises a plurality of devices, the vehicle communications network may be used for communications between devices represented as the vehicle computer 110 in this disclosure. Further, as mentioned below, various controllers and/or sensors 112 may provide data to the vehicle computer 110 via the vehicle communication network.

Vehicle sensors 112 may include a variety of devices such as are known to provide data to the vehicle computer 110. For example, the sensors 112 may include Light Detection And Ranging (LIDAR) sensor(s) 112, etc., disposed on a top of the vehicle 100, behind a vehicle 100 front windshield, around the vehicle 100, etc., that provide relative locations, sizes, and shapes of objects surrounding the vehicle 100. As another example, one or more radar sensors 112 fixed to vehicle 100 bumpers may provide data to provide locations of the objects, second vehicles, etc., relative to the location of the vehicle 100. The sensors 112 may further alternatively or additionally, for example, include camera sensor(s) 112, e.g. front view, side view, etc., providing images from an area surrounding the vehicle 100.

The sensors 112 may further include temperature sensors, pressure sensors, rotation sensors, angle sensors, position sensors, torque sensors, etc. to detect vehicle operating states such as vehicle cabin temperature, vehicle engine temperature, vehicle speed, vehicle acceleration, vehicle turning angle, engine rotational speed, brake pressure, etc. For example, position sensors 112 may detect a position of a shifter input device 123, 124. As another example, force or pressure sensors 112 may detect a force applied to a shifter input device 123, 124.

The vehicle 100 actuators 114 are implemented via circuits, chips, or other electronic and or mechanical components that can actuate various vehicle subsystems in accordance with appropriate control signals as is known. The actuators 114 may be used to control vehicle components 116, including braking, acceleration, and steering of the vehicle 100.

In the present context, a vehicle component 116 is one or more hardware components, which may include an electronic control unit (ECU) including one or more processors and memory including instructions for programming the processors, adapted to perform a mechanical or electro-mechanical function or operation—such as moving the vehicle 100, slowing or stopping the vehicle 100, steering the vehicle 100, etc. Non-limiting examples of vehicle components 116 include a propulsion component (that includes, e.g., an internal combustion engine and/or an electric motor, etc.), a transmission 116t, a steering component (e.g., that may include one or more of a steering wheel, a steering rack, etc.), a brake component (as described below), a park assist component, an adaptive cruise control component, an adaptive steering component, a movable seat, a suspension, an electronic stability control (ESC) module, a wiper control module, lighting, an entertainment system, etc.

The transmission 116t is a vehicle component 116 adapted to transfer motive force from a propulsion component 116 (motor and/or engine) to vehicle wheels. Based on commands from the computer 110, the transmission 116t can change a ratio between a rotational speed of the vehicle wheels and the rotational speed of the propulsion component 116. The transmission 116t may be programmable to operate in one or more modes including an automatic mode and a semi-automatic mode. In the automatic mode, the computer 110 may determine, based on vehicle operating conditions, a target gear ratio for the transmission 116t and send commands to the transmission 116t to change the gear ratio to match or substantially match the target gear ratio. In the semi-automatic mode, the computer 110 may receive user input via a shifter input device 123, 124 to increase (shift up)

or decrease (shift down) the gear ratio. In response to the user input, the computer 110 sends a command to the transmission 116*t* to change the gear ratio in accordance with the user input.

The vehicle 100 further includes a human-machine interface (HMI) 118. The human-machine interface (HMI) 118 includes input devices such as knobs, buttons, switches, pedals, levers, touch screens, microphones, etc., that can receive input from a user. For example, the HMI 118 may include a brake pedal, an accelerator pedal, and a steering wheel for receiving inputs from a user for controlling the vehicle 100. The input devices may include sensors 112 to detect user inputs and provide user input data to the computer 110. For example, the steering wheel may include sensors 112 to detect an angle of rotation of the steering wheel and provide the data to the computer 110.

The HMI 118 further typically includes output devices such as displays (including touch screen displays), speakers, lights, etc. that output signals or data to the user.

The HMI 118 is coupled to the vehicle communications network and can send and/or receive messages to/from the computer 110 and other vehicle sub-systems. As non-limiting examples, the HMI 118 may, based on user inputs, send messages over the vehicle communications network to control vehicle control systems, climate control systems, entertainment systems, lighting systems, communications systems, etc.

FIGS. 2-5 illustrate examples of shifter input devices 123, 124 and corresponding haptic devices 126 suitable for generating haptic feedback for the respective shifter input devices 123, 124. Shifter input devices 123, 124 receive input from a user regarding desired changes to the gear ratio of the transmission 116*t* and output user input data to the computer 110. The shifter input devices 123, 124 may be moving or stationary as described further below. Haptic devices 126 generate physical movement, typically vibratory, in response to commands and/or electrical input signals received from the computer 110, as stated above. As also described further below, non-limiting examples of haptic devices 126 include a linear resonant actuator (LRA) 126*a* and an eccentric rotation motor (ERM) 126*b*.

Figure 2:
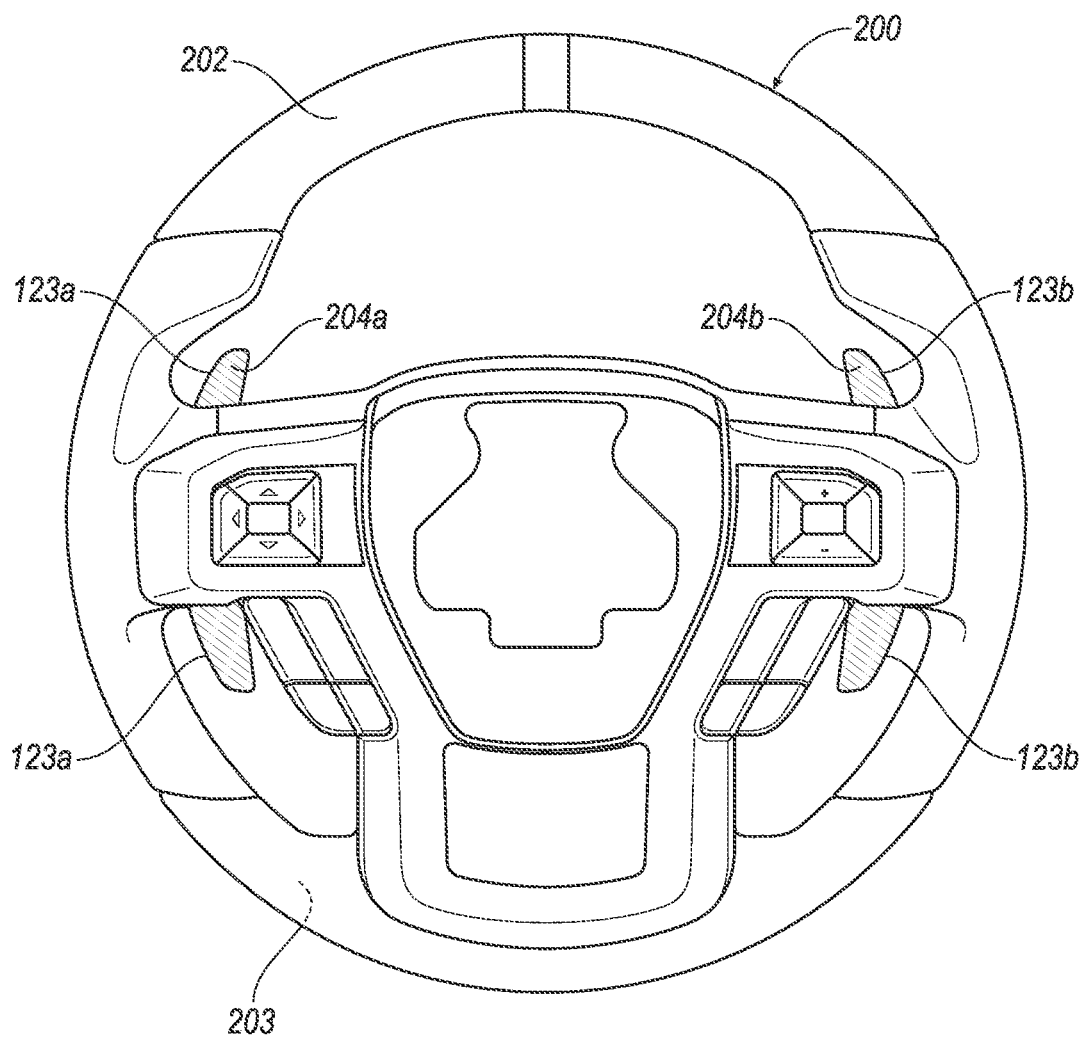
FIG. 2 is a front view of an example steering wheel including paddle shifters.
Figure 3:
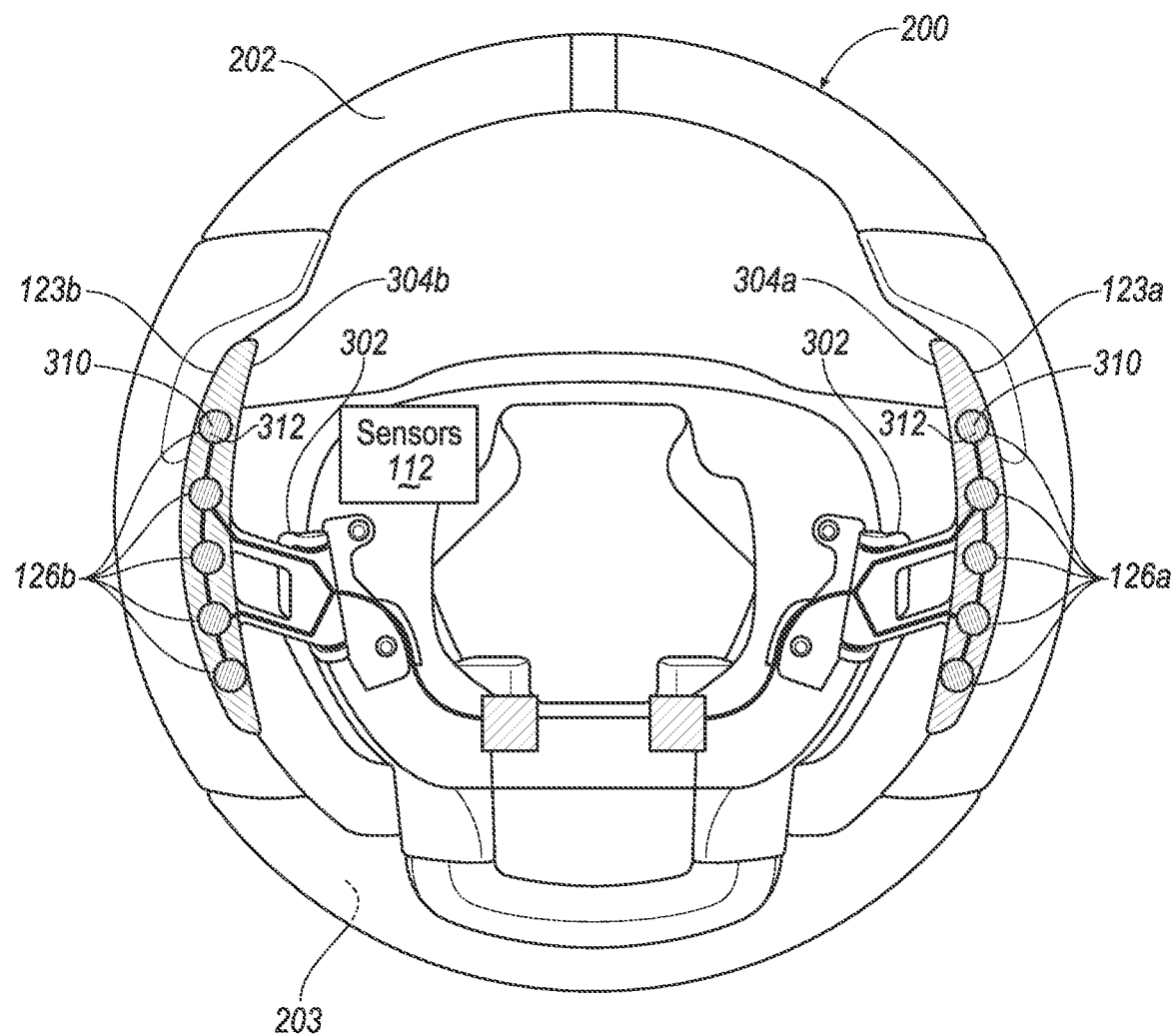
FIG. 3 is a rear view of the example steering wheel of FIG. 2, including haptic devices.

FIGS. 2 and 3 illustrates a steering wheel 200. The steering wheel 200 has a first side 202 typically facing a user of the steering wheel 200, i.e., the user typically faces forward and the steering wheel first side 202 therefore faces toward a back of the vehicle 100. The steering wheel 200 further has a second side 203 typically facing away from the user toward a front of the vehicle 100. The steering wheel 200 includes first and second paddle shifters 123*a*, 123*b*. The first and second paddle shifters 123*a*, 123*b* may be collectively referred to herein as paddle shifters 123. The first and second paddle shifters 123*a*, 123*b* are levers attached to the steering wheel 200 such that they are accessible to receive input from the user while steering. The paddle shifters 123*a*, 123*b* have corresponding first sides 204*a*, 204*b*, and corresponding second sides 304*a*, 304*b*.

In an example shown in FIGS. 2 and 3, the first and second paddle shifters 123*a*, 123*b*, are attached on the second side 203 of the steering wheel via an attachment mechanism 302. The first and second paddle shifters 123*a*, 123*b* may be movable or stationary. In a case of moving first and second paddle shifters 123*a*, 123*b*, the attachment mechanism 302 may be a hinge or other attachment that permits movement of the first and second paddle shifters 123*a*, 123*b*. In the case of moving paddle shifters 123*a*, 123*b*, the user may provide input to the first or second paddle shifters 123*a*, 123*b* by pulling the respective first or second paddle 123*a*, 123*b* toward the steering wheel 200 (in a direction toward the user activating the first or second paddle shifter 123*a*, 123*b*). In another example, the first and second paddle shifters 123*a*, 123*b* may be stationary. In this case the attachment mechanism 302 may be rigid. The user may provide input to the first or second paddle shifters 123*a*, 123*b* by applying a force to a surface (e.g. pushing the surface with a finger or thumb) of the respective first or second paddle shifter 123*a*, 123*b*. For example, the force may be applied to the second side 304*a*, 304*b* of the respective first and second paddle shifter 123*a*, 123*b*.

The steering wheel 200 includes sensors 112. In the case of moving first and second paddle shifters 123*a*, 123*b*, the sensors 112 may detect, for example, that the respective first or second paddle shifter 123*a*, 123*b* is displaced a predetermined distance to activate a position sensor 112. As an example, the sensor 112 may be a contact sensor 112 that detects when the first or second paddle shifter 123*a*, 123*b* has been moved the predetermined distance and provide user input to the computer 110.

The computer 110 may receive and evaluate the user input data to determine whether the user input data constitutes a valid input. For example, based on data from the sensors 112, the computer 110 may be programmed to determine that the first or second paddle shifters 123*a*, 123*b* have been displaced the predetermined distance for a predetermined for a predetermined time. The predetermined distance may be, for example 5 millimeters (mm) and the predetermined amount of time may be 100 milliseconds (mS).

In the case that the first and second paddle shifters 123*a*, 123*b* are stationary, the sensor 112 may be a pressure or force sensor 112 that detects a predetermined force on the respective attachment mechanism 302 and provides user input data to the computer 110.

The computer 110 may receive and evaluate the user input data to determine whether the user input data constitutes a valid input. Based on data from the sensors, the computer 110 may be programmed to determine that the force applied to the first or second paddle shifter is above a predetermined force threshold for a predetermined amount of time. A typical value for the predetermined force may be 7 Newtons (N) and a typical value of the predetermined amount of time may be 100 milliseconds (mS).

The predetermined distance (in the case of a moving paddle shifter 123*a*, 123*b*), predetermined force (in the case of a stationary paddle shifter 123*a*, 123*b*), and predetermined amount of time may be determined empirically during design of the vehicle 100. Additionally, the predetermined distance, predetermined force and predetermined time may be programmable, and adjusted, for example, by software updates after production of the vehicle 100.

To provide haptic feedback, linear resonant actuators (LRAs) 126*a* (FIG. 3) may be embedded in or attached to a back of the first and second paddle shifters 123*a*, 123*b*. In the example, five linear resonant actuators 126*a* are included respectively in each of the first and second paddle shifters 123*a*, 123*b*. Five is only an example. Any suitable number of linear resonant actuators 126*a* may be attached to each of the first and second paddle shifters 123*a*, 123*b*.

As shown in FIG. 3, each linear resonant actuator 126*a* may be disc shaped and be embedded in the respective first or second paddle shifter 123*a*, 123*b*. Each linear resonant actuator includes a first surface 310 facing toward the first surface 304*a* of the respective first or second paddle shifters 123*a*, 123*b*, and a second surface 312 facing toward the back surface 304*b* of the respective first and second paddle shifters 123*a*, 123*b*. The principle of operation of the linear resonant actuator 126a is to create a magnetic field using electrical current to exert a magnetic force on a magnetic object. The force moves a mass that is attached to a spring which returns the mass to a center point. By varying the magnetic force (voltage applied to the coil causing a change to the current through the coil), the magnetic mass is driven back and forth creating vibration. The vibration is in a direction substantially perpendicular to the first and second surfaces 310, 312 of the linear resonant actuator 126a. The resonant frequency of the linear resonant actuator 126a is set by the mass and the spring stiffness and is specified by a manufacturer of the linear resonant actuator 126a. To achieve an efficient conversion of electrical energy to mechanic energy (vibration), the linear resonant actuator 126a should be driven by a sine wave at the resonant frequency of the linear resonant actuator, typically around 235 Hertz.

An example of a suitable commercially available linear resonant actuator 126a is the BLM0832-FP74-1S-U manufactured by Baolong Electronic Group Co. Ltd, 388 Ning-Kang East Rd, YueQing, Zhejiang, China.

Figure 4:
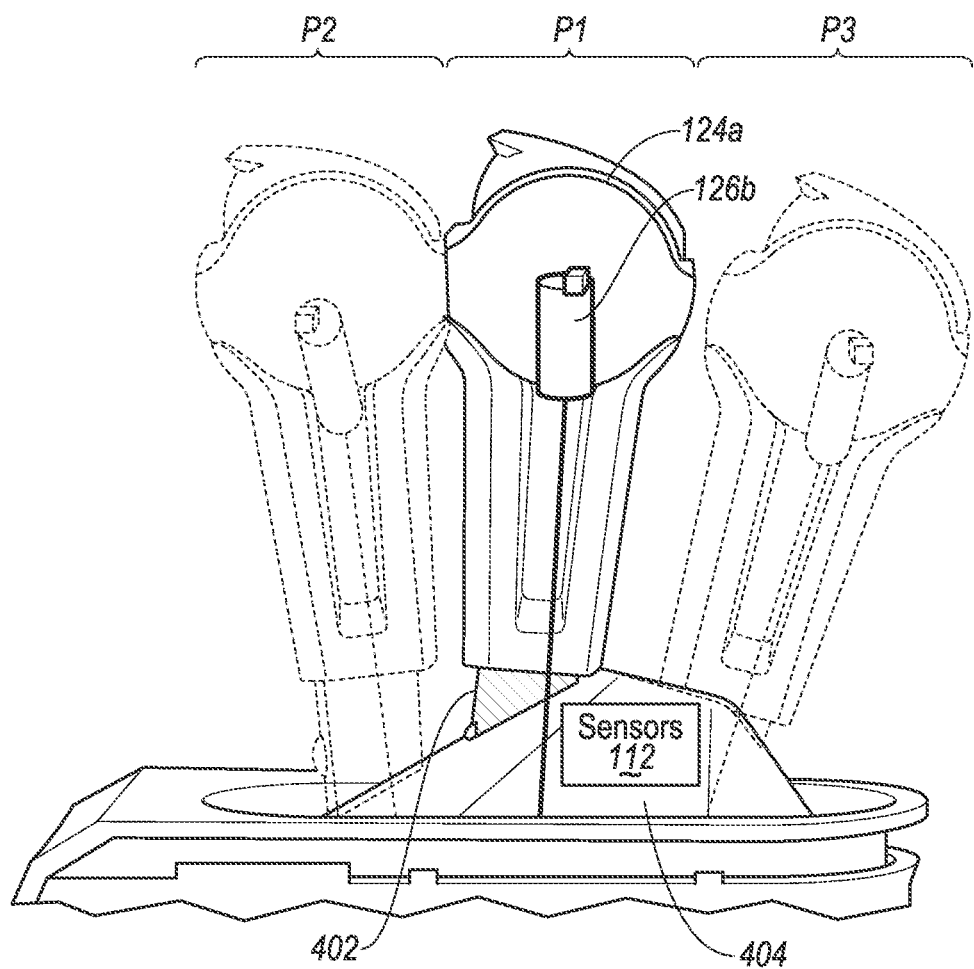
FIG. 4 is a side view of an example moving console shifter.

Console shifters 124 include moving console shifters 124a and stationary console shifters 124b. FIG. 4 illustrates a moving console shifter 124a. The moving console shifter 124a includes a shaft 402. The shaft 402 connects the moving console shifter 124a to a base 404. The base 404 includes sensors 112. The sensors 112 may be, for example, position sensors 112, which sense a position of the moving console shifter 124a.

In an example, the console shifter 124a is in a first position P1 when at rest. The console shifter 124a being at rest means that the user is not displacing the moving console shifter 124a. In the example, the user can input a request to increase a gear ratio (upshift) of the transmission 116t by displacing the moving console shifter 124a to a second position P2. Alternatively, the user can input a request to decrease the gear ratio (downshift) by displacing the moving console shifter 124a to a third position P3. Sensors 112 can be adapted to detect when the moving console shifter 124a is in the first, second or third positions P1, P2, P3 and provide corresponding user input data to the computer 110.

The computer 110 may receive and evaluate the user input data to determine whether the user input data constitutes a valid input. For example, the computer 110 may be programmed to determine that the moving console shifter 124a has been displaced to the second position P2 or the third position P3 for a predetermined time. The predetermined amount of time may be 100 milliseconds (mS). Following inputting the request to increase or decrease the gear ratio, the user releases the console shifter 124a, and the console shifter 124a returns to the first position P1.

The console shifter 124a includes an eccentric rotating motor 126b. The eccentric rotation mass includes a motor with a rotor attached to (or including) a rotatable mass having an asymmetrical mass distribution. The asymmetrical mass causes the eccentric rotating motor to vibrate. The eccentric rotating motor 126b operates as a direct current (DC) motor. As a voltage applied to the eccentric rotating motor 126b is increased, both the frequency of the vibration, and the amplitude of the vibration increase within a range of operation.

An example of a suitable commercially available eccentric rotating motor 126b is eccentric rotating motor Model: 310-002 manufactured by Precisions Microdrives Limited, Unit 1.07, Cantebury Court, 1-3 Brixton Road, London, SW9 6DE, United Kingdom.

Figure 5:
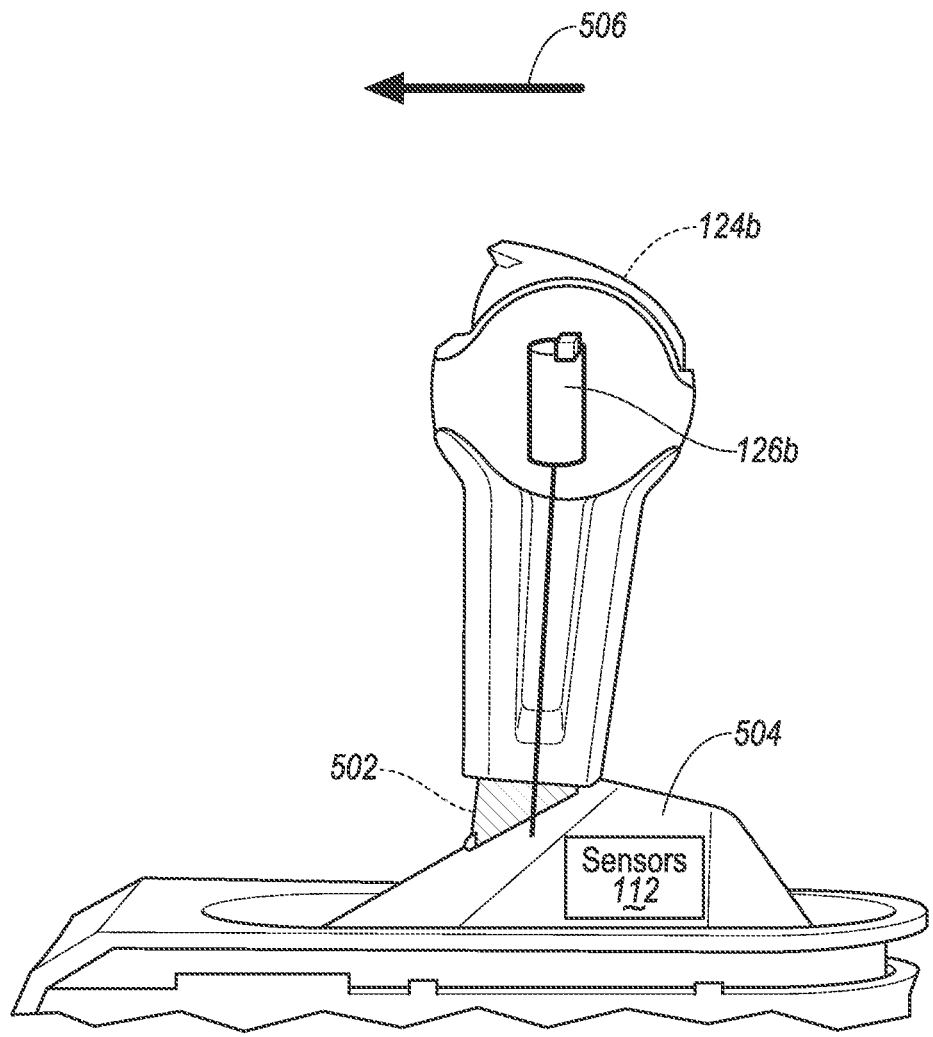
FIG. 5 is a side view of an example stationary console shifter.

FIG. 5 illustrates a stationary console shifter 124b including a shaft 502 and an eccentric rotating motor 126b. The shaft 502 is connected to a base 504 such that the stationary console shifter 124b is maintained in a substantially stationary position. The base 504 includes sensors 112 that can detect force applied in a forward or backward direction of the stationary console shifter 124b. The forward direction means in a direction of the arrow 506. This would typically be in a direction towards the front of the vehicle 100. The reverse direction is in a direction opposite the arrow 506.

The user applies force in the forward direction or reverse direction to the stationary console shifter 124b to input a request for a gear change. For example, force applied to the stationary console shifter 124b in a forward direction may indicate a request to increase the gear ratio (upshift) and force applied in the reverse direction may indicate a request to decrease the gear ratio (downshift). Sensors 112 mounted within the base 504 may sense the force applied to the stationary console shifter 124b and in response, send user input data to the vehicle computer 110 indicating the detected force. The computer 110 may receive and evaluate the user input data to determine whether the user input data constitutes a valid input. For example, the computer 110 may determine that the force applied to the stationary console shifter 124b is greater than a predetermined force threshold for a predetermined amount of time.

The predetermined force and predetermined amount of time may be determined empirically during design of the vehicle 100. Additionally, the predetermined force and predetermined time may be programmable, and adjusted, for example, by software updates after production of the vehicle 100. A typical value for the predetermined force may be 7 Newtons (N) and a typical value of the predetermined amount of time may be 100 milliseconds (mS).

The computer 110, upon determining that the input is a valid input, may send a command to the transmission 116t to increase or decrease the gear ratio. Further, the computer 110 may send a command to the eccentric rotating motor 126b to generate haptic feedback. In this manner, the user can be provided output indicating that the computer 110 has acknowledged receiving a valid input to change the gear ratio.

Figure 6:
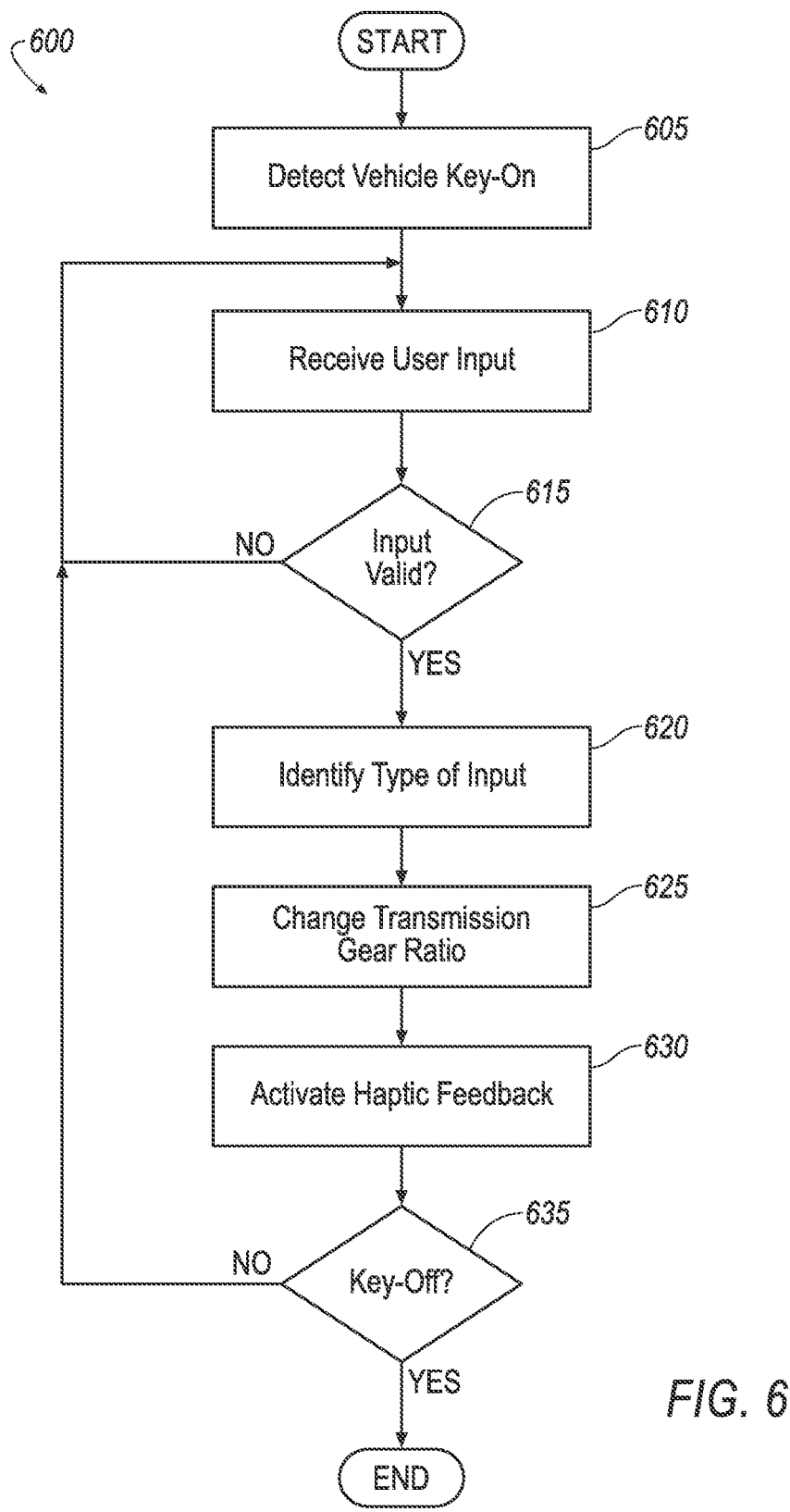
FIG. 6 is a flowchart of an example process for providing haptic feedback in response to user input to a vehicle transmission via a shifter input device.

FIG. 6 is a flowchart of an example process 600 for providing haptic feedback in response to user input to a transmission 116t via a shifter input device. The process 600 begins in a block 605.

In the block 605, the computer 110 detects a key-on (e.g., ignition or input to an "on" button or the like) event of the vehicle 100. Detecting a key-on event means receiving and evaluating data, for example, via the vehicle communications bus, that the vehicle has been turned on. For example, a user may enter the vehicle with a passive entry passive start (PEPS) device and activate (press) an "on" button on the vehicle dashboard. The computer 110 may recognize the presence of the PEPS device and validate the PEPS device. Based on detecting the activation of an "on" button or the like and validating the PEPS device, the computer 110 may recognize a detection of the key-on event. Upon detecting the key-on event, the process continues in a block 610.

In the block 610, the computer 110 receives data indicating user input from a shifter input device 123, 124. In the case that the shifter input device 123, 124 is a moving paddle shifter 123 or a moving console shifter 124a, the data may indicate an amount of time that the shifter input device 123, 124a was displaced greater than a predetermined distance. In the case that the shifter input device 123, 124 is a stationary paddle shifter 123 or a stationary console shifter 124b, the data indicating user input from the input shifter device 123, 124b may be data indicating a force applied to the shifter input device 123, 124b during an amount of time or at a plurality of times. The process 600 continues in a block 615.

In the block 615, the computer 110 determines whether the user input data is valid. As non-limiting examples, for a moving paddle shifter 123 or a moving console shifter 124a, determining that user input data is valid may mean determining that the moving paddle shifter 123 or moving console shifter 124a is moved greater than or equal to a predetermined distance, for example, a sufficient distance to activate a sensor 112, for an amount of time greater than or equal to a predetermined amount of time. For a stationary paddle shifter 123 or a stationary console shifter 124b, determining that the user input is a valid input may mean determining that a force applied to the stationary paddle shifter 123 or stationary console shifter 124b is greater than a predetermined force for an amount of time greater than a predetermined amount of time.

As another example, additionally or alternatively to determining that the displacement or applied force to the shifter input device 123, 124 continues for the amount of time greater than the predetermined time, the computer 110 may further determine that the user input is valid when the displacement or applied force continues until the haptic feedback has begun. In other words, the computer 110 may determine that the user input is valid if, upon detecting the displacement or applied force to the shifter input device, the computer 110, for example, after a first predetermined amount of time, generates the haptic feedback. The computer 110 may then determine that the displacement or applied force continues for at least a second amount of time after the beginning of the haptic feedback to validate the user input.

The above examples are non-limiting and other types of data may alternatively or additionally be used to determine whether a user input is valid. For example, a valid user input could require two or more consecutive activations (displacement or application of a force) of a shifter input device. As another example, the computer 110 may be programmed to determine a valid user input when an activation continues until haptic feedback is provided to the user by the haptic device 126 in the shifter input device 123, 124. Further, determining that the user input is valid may depend on an operating condition of the vehicle 100. For example, in a case that the vehicle 100 is running (e.g., ignition on, key-on, engine running, etc.), but not moving, computer 110 may ignore an input from the shifter input device 123, 124.

Upon determining that the user input data is valid, the process 600 continues in a block 620. Otherwise, the process 600 returns to the block 610.

In the block 620, the computer 110 identifies a type of user input based on the user input data. In the case of receiving user input data from a paddle shifter 123, the computer 110 determines whether a paddle shifter 123a for increasing the gear ratio (upshift) was activated or a paddle shifter 123b for decreasing the gear ratio (downshift) was activated. In the case of receiving user data from a console shifter 124a, 124b, the computer 110 determines respectively whether the console shifter 124a, 124b was activated (displaced or a force applied) in a forward direction or reverse direction. The process 600 continues in a block 625.

In the block 625, the computer 110 sends a command to the transmission 116t to increase or decrease the gear ratio based on the identified type of user input. The process 600 continues in a block 630.

In the block 630, the computer 110 sends a command to the haptic device 126a, 126b included in the shifter input device 123, 124. The haptic device 126a, 126b generates haptic feedback, causing the shifter input device 123, 124 to move. As described above, typically, the movement generated by the haptic device 126a, 126b is a vibration. In practice, the block 630 may be executed simultaneously or before the block 625. The process continues in a block 635.

In the block 635, the computer 110 determines a key-off event has occurred. For example, the computer 110 may detect that the user has provided input, e.g., activated a button or turned a key, to turn off the vehicle 100. In the case that the computer 110 determines that a key-off event has occurred, the process 600 ends. Otherwise, the process 600 continues in the block 610.

In addition to providing haptic feedback in response to user input to the transmission 116t, the haptic devices 126 may provide haptic feedback for other vehicle operating conditions. For example, the user may be able to select a "Sport" or "Track" mode of vehicle operation. To provide a sportier feel to driving the vehicle 100 in the Sport or Track mode, the computer 110 may be programmed to command the haptic device 126 to vibrate based on an engine or motor speed above a respective predetermined engine or motor speed. The respective engine or motor speed to trigger the haptic feedback may be determined empirically as an engine or motor speed above which a typical user has a feel of sporty driving rather than utility driving. For example, this may be an engine or motor speed above which the transmission 116t in an automatic mode would have shifted and/or a user would normally perform an upshift.

Further, in addition to turning the haptic feedback devices 126 on or off, the haptic feedback devices 126 may be programmed to produce response sequences. A response sequence is a sequence of haptic feedback signals in response to a user input and/or vehicle operating condition. A response sequence may be designed, for example, to increase a satisfaction level of a user or communicate an operating condition of the vehicle 100. For example, upon detecting that the user has activated a paddle shifter 123, the computer 110 may command the haptic device 126 to generate an initial high amplitude haptic feedback followed by an extended lower amplitude haptic feedback. In the case of using eccentric rotating motors as haptic devices 126, a frequency of vibration can be changed over time. For example, in a Sport or Track mode, when an engine or motor speed is above a respective predetermined engine or motor speed, the eccentric rotating motor can be commanded to provide haptic feedback, and a frequency of the haptic feedback may be made to change in a same direction as the engine or motor speed. That is, as the engine or motor speed increases, a frequency of the haptic feedback can be made to increase or decrease. These examples are non-limiting, and other variations of activating the haptic devices 126 to indicate vehicle operating conditions are also possible.

Still further, the computer 110 may be programmed to provide haptic feedback indicating a kind of user input to the transmission 116t. For example, the computer 110 may provide haptic feedback at a first frequency, amplitude, and/or for a first amount of the time for an upshift and provide haptic feedback at a second frequency, amplitude, and/or for a second amount of time for a downshift.

Still further, the computer 110 may be programmed to provide haptic feedback indicating a driving style of the user. For example, the computer 110 may maintain tables indicating ranges of motor or engines speeds for upshifting to optimize fuel efficiency. In a case that a user requests a gear change within the range of motor or engine speeds for changing a gear to optimizing fuel efficiency, the computer 110 may provide a haptic feedback at a first frequency, amplitude, and/or for a first amount of time. In a case that the user requests a gear change outside of the range for optimized fuel efficiency, the computer 110 may provide the haptic feedback at a second frequency, amplitude, and/or for a second amount of time.

Still further, the computer 110 may be programmed to prohibit gear changes under particular vehicle operating conditions. For example, in a case that the user requests an upshift at a motor or engine speed that does not support the upshift (e.g., the engine may stall, or the engine or motor torque may be insufficient to accelerate the vehicle at the current engine speed, etc.), the computer 110 may be programmed to provide notice to the user that the gear change will not be executed. For example, the computer 110 may maintain a table of engine speeds and corresponding appropriate vehicle speeds for changing gears. In a case that the user requests a gear change when, based on the table, the vehicle speed is not appropriate for a gear change based on the engine or motor speed, the computer 110 may provide response sequence indicating that the gear change will not be executed. For example, the computer 110 may be programmed to provide three bursts of haptic feedback, each for a first amount of time, separated by amounts of time with haptic feedback for a second amount of time.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

As used herein, the term "based on" means based on in whole or in part.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, Python, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. CD-ROM and DVD are examples of write once/read many (WORM) devices.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
    a transmission shifter input device on a vehicle; and
    a computer comprising a processor and a memory, the memory including instructions such that the processor is programmed to:
        detect, via the shifter input device, a user input to shift the vehicle transmission; and
        generate, via the shifter input device, a haptic feedback by a haptic feedback device located on or in the shifter input device;
    wherein the transmission shifter input device is one of a paddle shifter mounted on a steering wheel of the vehicle or a console shifter mounted on a console of the vehicle; and
    wherein detecting the user input includes, for an amount of time greater than a predetermined amount of time, detecting one of a displacement of the transmission shifter input device greater than a predetermined displacement or a force applied to the transmission shifter input device greater than a predetermined force.

2. The system of claim 1, wherein the haptic feedback is vibratory.

3. The system of claim 1, wherein the paddle shifter is displaceable and detecting the user input includes detecting a displacement of the paddle shifter greater than a predetermined displacement.

4. The system of claim 1, wherein the paddle shifter is stationary and detecting the user input includes detecting a force applied to the paddle shifter greater than a predetermined force.

5. The system of claim 1, wherein the shifter input device is the paddle shifter mounted on the steering wheel and the haptic feedback is generated by a linear resonant actuator mounted on or in the paddle shifter.

6. The system of claim 5, wherein the linear resonant actuator is embedded in the paddle shifter.

7. The system of claim 1, wherein the console shifter is displaceable and detecting the user input includes detecting a displacement of the console shifter greater than a predetermined displacement.

8. The system of claim 1, wherein the console shifter is stationary, and detecting the user input includes detecting a force applied to the console shifter greater than a predetermined force.

9. The system of claim 1, wherein the shifter input device is the console shifter mounted on the console of the vehicle and the haptic feedback is generated by an eccentric rotating motor mounted in the console shifter.

10. The system of claim 9, wherein the eccentric rotating motor is embedded in the console shifter.

11. A system comprising:
    a transmission shifter input device on a vehicle; and
    a computer comprising a processor and a memory, the memory including instructions such that the processor is programmed to:
        detect, via the shifter input device, a user input to shift the vehicle transmission; and
        generate, via the shifter input device, a haptic feedback, wherein a characteristic of the haptic feedback is based on an engine speed or motor speed at a time of detecting the user input to shift the vehicle transmission, wherein the haptic feedback is a sequence with a first amplitude for a first duration followed by a second amplitude for a second duration.

12. The system of claim 11, wherein the characteristic of the haptic feedback is further based on a target gear ratio for the shift of the vehicle transmission.

13. The system of claim 11, wherein the processor is further programmed to:
    upon detecting the user input to shift the vehicle transmission, determine whether the engine speed or the motor speed is within a predetermined range for the shift of the vehicle transmission;
    output the haptic feedback at a first frequency when the engine speed or motor speed is determined to be within the predetermined range; and
    output the haptic feedback at a second frequency when the engine speed or motor speed is determined not to be within the predetermined range.

14. The system of claim 11, wherein the processor is further programmed to:
    upon detecting the user input to shift the vehicle transmission, determine whether the engine speed or the motor speed is within a predetermined range for the shift of the vehicle transmission;
    output a first sequence of haptic feedback signals when the engine speed or motor speed is determined to be within the predetermined range; and
    output a second sequence of haptic feedback signals when the engine speed or motor speed is determined not to be within the predetermined range.

15. The system of claim 11, wherein the shifter input device is one of a paddle shifter and a console shifter.

16. The system of claim 11, wherein the first duration is shorter than the second duration.

17. The system of claim 16, wherein the first amplitude is greater than the second amplitude.

* * * * *